Sept. 12, 1972  D. J. BIECHELE, JR  3,690,899
PROCESSING CARP FOR HUMAN CONSUMPTION
Filed July 8, 1970
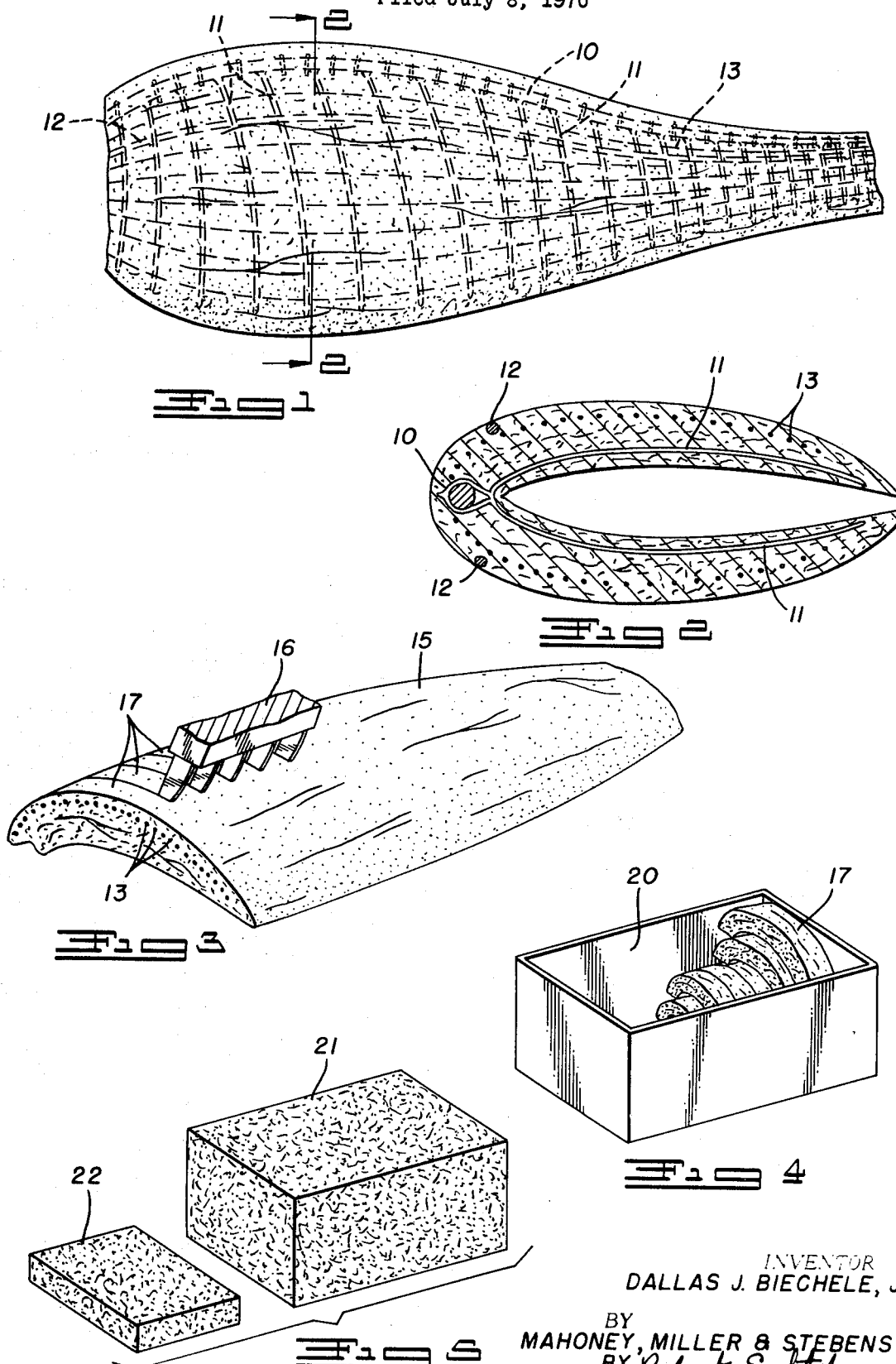
INVENTOR
DALLAS J. BIECHELE, JR.
BY
MAHONEY, MILLER & STEBENS
BY Robert E. Stebens
ATTORNEYS

United States Patent Office 3,690,899
Patented Sept. 12, 1972

3,690,899
PROCESSING CARP FOR HUMAN CONSUMPTION
Dallas J. Biechele, Jr., Sandusky, Ohio 44870
Filed July 8, 1970, Ser. No. 53,063
Int. Cl. A23l 1/325
U.S. Cl. 99—111                                 4 Claims

ABSTRACT OF THE DISCLOSURE

A process of treating carp to eliminate such characteristics as the mud vein, in darkness of meat, and the presence of fine bones, which ordinarily make the carp undesirable for human consumption. The mud vein is removed after cutting to expose it, a cold salt solution leaching operation is used to remove excess blood cells from the tissues which ordinarily give the meat its dark color, and a special scoring operation is used to cut the fine longitudinally extending bones, which cannot be removed by ordinary filleting, so that they will be in such short pieces that they will not be troublesome.

---

It is well known that carp is considered undesirable for eating by most people. There are three main reasons for this opinion as follows:

(1) The unappetizing mud vein in the tissue which runs down both sides of a carp just under the skin.

(2) The darkness of meat which is due to an excess of blood cells.

(3) The presence of fine bones, commonly called hair bones, running longitudinally of the carp and which are in such great numbers as to be too numerous to fillet out by ordinary methods.

These characteristics not only make the carp undesirable for eating when filleted by the usual methods, but also make it undesirable for use in forming fish sticks or patties. The only state in which the carp has been marketed to any extent is in the ground state.

According to the present invention, there is provided a unique procedure for processing the carp into a portion which will be commercially acceptable. This process eliminates the three undesirable characteristics of the carp specified above.

The best mode contemplated in carrying out the process of this invention will be described below with reference to the accompanying schematic drawings in which:

FIG. 1 is a longitudinal side elevational view indicating most of the body portion of a carp and illustrating diagrammatically its bone structure.

FIG. 2 is an enlarged transverse sectional view of the carp taken along line 2—2 of FIG. 1.

FIG. 3 is a perspective view illustrating the transverse scoring of a fillet of the carp to cut the longitudinally extending hair bones and slice the fillet into thin slices.

FIG. 4 is a perspective view illustrating the slices in a pressing or forming pan.

FIG. 5 is a perspective view showing the formed loaf of fish and a stick or cake cut therefrom.

Specifically, according to the present invention, a live carp of two pounds or above is secured and is killed by a sharp blow with a wooden or metal billy club. The head and tail are removed and it is skinned in the easiest manner. The carp has a bone structure as indicated in FIGS. 1 and 2 which consists mainly of the backbone 10 and the attached transverse ribs 11, and the longitudinal hair bones 13 disposed outside the ribs, with the mud vein 12 running the full length of the fish from head to tail. The carp is then filleted by means of cutting and lifting out of the backbone 10 with the ribs 11 and cutting into two halves. However, the long haid bones 13, which extend substantially the full length of the fish, will not come out with the skeleton which includes the backbone 10 and ribs 11. After filleting of the fish and cutting into two halves, the mud vein 12 is removed by cutting along the vein to expose it and pulling it out of the tissues by hand. In doing this, the carp is cut longitudinally along each of the two filleted halves, one of which is indicated by the numeral 15 in FIG. 3. However, each half 15 will still have the secondary bone structure in the form of the longitudinally extending hair bones embedded therein and adjacent the outer side thereof.

The next step, according to this invention, is to treat the fillet 15 to improve its color. For this purpose, it is leached in a saline solution which is prepared by using about one pound of salt to fifteen gallons of water. The fillet is soaked in the salt water for a period of about three to five minutes and the temperature of the solution is maintained low to prevent development of any harmful bacteria and the enzymes that tend to give the fish undesirable characteristics. The solution temperature should be below 45° and preferably in the range of 33° to 45°. After soaking, the fillet 15 is removed and rinsed with fresh water.

Next, the fillet is cut transversely into steaks or strips of one-sixteenth to one-fourth inch thickness. Simultaneously, the hair bones 13 are cut into small pieces of corresponding lengths so that such minute pieces of bone will not be harmful or noticeable when eating the finished product. This operation is preferably accomplished, as indicated in FIG. 3, in which a multiple-blade scoring knife is indicated at 16 although a single-bladed knife could be used. The fillet 15 is placed onto a cutting board, belly-down, to expose its outer surface with the bones 13 close to the surface. If the scoring knife 16 is used as indicated, it is preferred that the blades be set one-eighth inch apart. The fillet 15 is scored transversely from one end to the other to produce the strips or steaks of one-eighth inch thickness and to cut the hair bones 13.

The steaks or slices 17 are then placed in a pressing or forming pan 20. If possible, the steaks or slices should be placed flat in the pan as indicated. Then pressure is applied to press the steaks or strips 17 into a loaf 21, as indicated in FIG. 5, from which patty size cakes or sticks 22 can be cut. The size of the pan 20 will determine the area of the finished product 22 and its thickness may be selected in slicing the loaf 21. A suitable size is 4 x 5 inches by ⅜ inch thick. The loaf 21 is preferably subjected to sharp freezing while in the pan 20 and after freezing is removed for slicing or cutting into patties or sticks.

The patties or sticks 22 can be battered and dipped into breading to make them ready for frying or they can be stored in this form, if frozen, for future use.

The above described process is unique and simple, but is very effective for removing from the carp these undesirable characteristics which have made it unattractive for human consumption. It results in a commercially acceptable edible product which is much more appetizing than carp in the ground state which has been the only form on the market in the past. The formed product of this process is much more desirable than the ground product because the original texture and the high protein content is not lessened or destroyed.

Having thus described this invention, what is claimed is:

1. The method of treating carp to make it attractive for human consumption which comprises:
   selecting a carp and killing it;
   skinning the carp;
   filleting the carp by removing its backbone and attached rib bones forming two fillet halves;
   removing the mud vein from the carp by cutting along the vein on each fillet half and exposing the vein and removing it;

placing the two fillet halves in a cool saline solution and leaching to remove blood from the tissue to improve its color;

cutting each of the fillets transversely to produce thin slices not greater than one-fourth (¼) inch in thickness and to simultaneously cut through the longitudinally extending hair bones to cut them into short lengths; and assembling a plurality of the thin slices into a loaf and compressing the slices thus assembled in a compacted mass suitable for dividing into portions.

2. The method of claim 1 in which the saline solution contains salt in the approximate amount of 1 lb. of salt to 15 gallons of water.

3. The method of claim 1 in which the saline solution is at a temperature below 45° and the fillets are allowed to leach for at least three minutes.

4. The method of claim 1 in which the compressed loaf of thin slices is frozen prior to dividing into portions.

References Cited

UNITED STATES PATENTS

| | | | |
|---|---|---|---|
| 2,234,658 | 3/1941 | Smith | 99—111 |
| 2,911,668 | 11/1959 | Johnson | 17—52 |
| 2,088,831 | 8/1937 | Ash et al. | 99—160 |
| 2,643,952 | 6/1953 | Crowther et al. | 99—111 |

A. LOUIS MONACELL, Primary Examiner

R. M. ELLIOTT, Assistant Examiner

U.S. Cl. X.R.

99—160